UNITED STATES PATENT OFFICE 2,429,698

METHOD OF PRODUCING POLYSULFIDE RUBBER COATINGS

Wallace K. Schneider, Pittsburgh, Pa., assignor to Stoner-Mudge, Inc., Pittsburgh, Pa., a corporation of Pennsylvania No Drawing. Application November 7, 1945, Serial No. 627,287

7 Claims. (Cl. 117—62)

This invention relates to polysulfide synthetic rubber and polysulfide polymers. It relates specifically to a process for producing a vulcanized or "cured" polysulfide rubber film, deposited in place as a viscous liquid coating, and thereafter treated in particular manner as hereinafter fully described.

Polysufide synthetic polymers of various types are well known to the art. As set forth in a number of patents issued to Joseph C. Patrick, including U. S. 1,890,191, issued December 6, 1932, and U. S. 2,216,044, issued September 24, 1940, to which reference is made, these polymers may be made by reacting polyfunctional organic compounds with alkali metal polysulfides where the functionality is due to the presence of two or more substituents split off by reaction with said polysulfide, chlorine being the typical commercial representative of such functional substituents. The polymers may also be made by the reaction of polymercapto bodies with an agent which supplies oxygen or sulfur in active form and causes polymer formation by the removal of hydrogen and its conversion into water or hydrogen sulfide.

The particular polysulfide polymers with which my invention has to do are a type of "polyalkylene polysulfides" which may be represented by the general or type formula

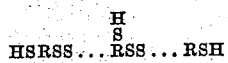

These polymers are composed essentially of the unit RSS and the molecular weight will vary with the number of these units in the polymeric molecule, and also with the specific structure of the organic radical R in the said molecule. The actual structure of the various polyalkylene polysulfides, of which there may be many, may differ widely with differences in the specific structure of the radical R but all these polymers are characterized by polyfunctionality in terms of SH (mercapto) groups.

Thus, the simplest structure responsive to the above general type formula would be a polythiopolymethylene mercaptan, the formula for which would be

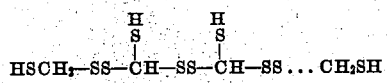

A typical polyalkylene polysulfide is derivable from trichlorethane and sodium disulfide; its idealized structure might well be represented as follows:

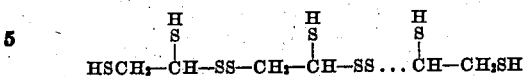

Another polyalkylene polysulfide of somewhat different properties is derivable from symmetrical trichlorpropane. Its structure would be

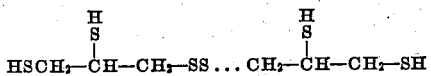

A polyalkylene polysulfide of particular importance in the instant invention is that in which the principal organic radical R is a "formal" unit of structure

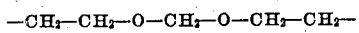

Commercially important polyalkylene polysulfides (distributed under the registered trade mark of "Thiokol") are frequently derived from mixtures of various polyfunctional organic halides reacted with an alkali metal polysulfide and thereafter treated in particular manner as described in the Patrick patents cited above, and others. And it will be understood that the term "polyalkylene polysulfide" as used herein designates any polymeric body responsive to the generalized formula

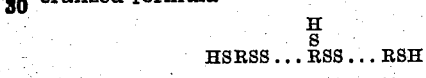

in which the significant functional groups are SH groups—whatever be the nature of the connecting organic radical R, and whether this be a single radical, such as an ethylene radical or a formal radical, or a mixture of such radicals. For the purposes of my invention, the presence of a plurality of mercapto groups is mandatory, the rest of the molecular structure being for my purposes relatively unimportant.

For convenience in describing these polymeric bodies, the connecting organic radical R appearing in the above illustrative generalized formula may be defined as "any polyvalent organic radical containing at least the grouping —CH$_2$— which results from the splitting off of at least 2 carbon-attached negative substituents from an organic compound initially containing at least 2 such substituents capable of being split off when the said compound is reacted with an alkali metal polysulfide."

The polyalkylene polysulfides vary in physical properties from those of a relatively hard, extremely viscous plastic mass to semi-fluidity, depending upon the degree of polycondensation which has been effected in their synthesis, and upon the specific nature of the substituent radical or radicals, R. For the purposes of my invention I prefer to employ those which are viscous liquids at ordinary temperatures, having about the consistency of molasses (10,000–50,000 centipoises). Such polymers have average molecular weights in the range of 1500 to 10,000 determined in the familiar manner by means of end group titration. For instance a preferred polymer, which may be derived from di-(chlor ethyl) formal and trichloropropane, has a molecular weight of approximately 4000. While my invention is applicable with polymers of lower or higher molecular weight, the principal advantage in semi-liquidity of the starting material lies in the fact that vulcanizable compositions derived from it may be applied without use of an excess of carrier solvent to surfaces which it is desired to coat by familiar techniques—typically by flushing, dipping, brushing, spraying, or by means of a knife spreader—and thereafter the so applied coating may be vulcanized in place, as hereinafter fully set forth.

It is an object of my invention to provide a process for coating metallic, wood, paper, cardboard, ceramic and other surfaces with a vulcanized, rubbery, flexible, water and solvent-resistant coating completely free from tendency to flow or crack under extremely severe temperature ranges (from $-70°$ F. to $+200°$ F.)

It is a further object of my invention to provide a means for lining tanks and similar vessels so constructed as to preclude direct access, with a vulcanized rubbery lining completely resistant to the action of water, aqueous solutions of diverse chemicals, and particularly to aviation grade gasoline and similar petroleum products, by flush coating and thereafter curing the coating in place without the use of heat.

The unique applicability of polysulfide synthetic rubbers for lining gasoline drums, storage tanks and containers is now well known to the art. In co-pending U. S. patent applications Serial No. 546,572, filed July 25, 1944, and Serial No. 546,573, filed July 25, 1944, of which I am a joint inventor, the adaption of polysulfide synthetic rubber latexes to the problem of lining large storage tanks and similar structures which can be entered for purposes of applying the lining are fully described. While extremely useful, and of demonstrated practical merit, these earlier coating systems possess two distinct disadvantages: (a) because they are comprised of non-vulcanized polysulfide polymers there is a tendency to cold-flow and "sag" at elevated temperatures, and to lessened resistance to solvent attack by active solvents such as benzenoid hydrocarbons and chlorinated solvents; (b) the lining of the interior of many small or peculiarly shaped tanks, such as the wing tanks in aeroplanes and compartmented fuel tanks aboard ships, cannot be accomplished by direct access, so that a flush coating containing little or no volatile carrier is the most practical expedient, and flush coating with latex compositions is impractical if not impossible under these conditions.

The process of my present invention completely eliminates the above recited disadvantages of the prior art lining processes, and permits the lining of containers, tanks, drums and the like (wherein the interior cannot be coated by brushing or spraying), by fill and drain or sloshing methods—known to the art as "flush coating." The so-deposited viscous liquid film is then cured or vulcanized in place by exposing it to the action of a specially selected "promoter," yielding a tough, rubber-like, tightly-adherent coating having substantially impermeability to gasoline, fuel oil, lubricating oils, water and aqueous solutions, and the like. The unique merits of my invention will be particularly obvious to those familiar with the practical problem of sealing wing tanks for aircraft or for storage of diverse petroleum products in fabricated steel tanks.

The process of my invention is carried out as follows:

I first disperse in the liquid polyalkylene polysulfide previously described a reenforcing pigment and a controlled amount of an "accelerator" selected from the group consisting of certain reactive metal oxides (such as zinc oxide, magnesium oxide, cuprous oxide and cupric oxide), and certain peroxides (such as zinc peroxide, calcium peroxide and manganese dioxide). These ingredients are easily incorporated by means of a ball mill, burrstone mill, roller mill or other techniques familiar to coating formulators. The resulting package-stable composition may or may not be reduced in viscosity by addition of an organic solvent for the polyalkylene polysulfide. Typical useful solvents are the aliphatic ketones and aromatic hydrocarbons.

Reenforcing pigments which I have found to be useful (although it will be understood that the presence of such pigments is not mandatory for my purposes) are: aluminum powder, hydrated aluminas and clays such as those sold under the trade-mark "Dixie" and "Suprex"; silicates such as "Silene"; calcium carbonate (known to the trade as "Kalvan" and "Multifex"); carbon blacks such as furnace black, channel black and lamp black; inert metal oxides such as iron oxide, chromium oxide and the like.

It is important to control the amount of accelerator admixed with the polyalkylene polysulfide so that a ratio of no more than 10 parts by weight of accelerator to 100 parts by weight of polyalkylene polysulfide be present in order to insure complete package stability of the resulting vulcanizable coating composition. Similarly, no less than 2 parts of accelerator to 100 parts of polyalkylene polysulfide should be employed if a completely vulcanized coating is to be realized upon subsequent treatment as described hereinafter. In general, I prefer to employ amounts of accelerator in the range of 3–5 parts to 100 parts of polyalkylene polysulfide.

It is to be understood that the above described coating compositions, particularly adapted to application by fill and drain methods but also applicable by more conventional methods if desired, remain liquid and substantially unchanged upon prolonged exposure to air, even at elevated temperatures (exceeding 180–200° F., for example); the coating is not cured or vulcanized, nor can it so become, without the following treatment:

The film, deposited in place, is now exposed to the action of a substance, in either liquid or vapor form (hereinafter for convenience termed a "promoter") selected from the group consisting of ammonia gas, ammonium carbonate or bicarbonate (all of which contain available $NH_3$ as their active ingredient) and aliphatic amines, of which methyl amine, ethyl amine, n-butyl amine, n-amyl amine, dimethyl amine, diethyl amine, triethyl amine, triethanol amine, morpholine, ethylene diamine, propylene diamine, and hexamethylene tetramine are typical. While this exhausts the list of readily available amine compounds, I have every reason to believe that any so called "free" aliphatic or cyclic amine will function satisfactorily for my purposes. In practice, because of its ready availability as an inexpensive compressed gas, I prefer to employ ammonia gas, although the standard 28 percent ammonium hydroxide of commerce is equally practical.

It is not necessary that the contained air be evacuated from the tank (for example) lined with my liquid coating composition, before exposing the lining to the promoter. When employing compressed ammonia I generally "purge" the tank through the bunghole or access port until a distinct odor of ammonia is noticeable. The opening is then sealed, and curing or vulcanization takes place in from 3 to 150 hours standing at room temperature, the time required to effect a complete vulcanization being determined by (a) the specific accelerator employed and (b) its concentration in the liquid coating composition, as would be expected.

The following specific examples will serve to illustrate the process of my invention, and make clear the manner in which it may be practiced.

Example I

To 100 parts by weight of a polyalkylene polysulfide having a viscosity of 35,000 centipoises (derived from di(chlorethyl) formal and trichlorethane reacted with a metallic disulfide for example) were added 30 parts of Gastex carbon black and 3 parts of zinc peroxide and the whole was thoroughly mixed in a ball mill. A film of the resulting coating composition was spread on a metal sheet and this was exposed to the action of gaseous ammonia for 6 hours. The cured film was tough and rubbery; it had excellent tensile strength and elongation, and was completely resistant to attack by aviation grade gasoline, lubricating oil, Diesel fuel and other petroleum products, as well as to water.

Example II

To 100 parts by weight of a polyalkylene polysulfide having a viscosity of 12,000 centipoises (derived from a mixture of trichloropropane and di(chlorethyl) formal reacted in the usual manner with an alkali metal polysulfide, for example) were added 25 parts of Pelletex carbon black and 10 parts of cuprous oxide. After mixing, the resulting product—demonstrably package-stable and incapable of being cured by heat—was spread as a film on glass and thereafter immersed in triethanol amine. Curing took place slowly, but after 100 hours the film, though of low Durometer hardness, was tough, rubbery, and unattacked by aromatic-fortified aviation gasoline, Diesel fuel and other petroleum products.

Example III

To 100 parts by weight of a polyalkylene polysulfide having a viscosity of 35,000 centipoises (typically that derivable from a mixture of ethylene dichloride and ethylene trichloride reacted with sodium polysulfide and thereafter reduced to the polymercaptan stage) were added 20 parts of calcium carbonate, 20 parts of iron oxide, 3 parts of metallic zinc and 3 parts of zinc oxide. The resulting composition, when spread as a film, is curable to a tough, resilient, gasoline-resistant coating upon exposure to ammonia, or an amine, for 100–150 hours.

Example IV

An airplane integral wing tank was completely filled with the flushing composition described in Example I after cutting to a viscosity of 1,200 centipoises with methyl ethyl ketone. The tank was then drained at a controlled speed to produce a coating thickness approximating a sixteenth of an inch, after which warm air (160–180° F.) was blown through the tank for 4 to 6 hours to remove excess solvent. Pans of commercial (28%) ammonium hydroxide were placed in the tank and the latter then sealed for 24 hours. The cured film which resulted was tough and rubbery, having good tensile strength and elongation and excellent resistance to high octane aviation gasoline. Service performance of the integral wing tank was entirely satisfactory under operational conditions.

Example V

The coating composition of Example I was cut to a viscosity of 1,000 centipoises with toluol and flushed through a steel pipe line intended for delivery of aviation gasoline. The pipe was then closed off and anhydrous ammonia from a battery of cylinders was let in until a pressure of 10 p. s. i. was built up. After 3 hours the lining was cured in place, and was completely resistant to gasoline, diesel fuel and other products delivered through the pipe line.

It will be understood that the above examples are presented for illustration only, and that I am not limited to the specific compositions therein detailed.

Having described my invented process and shown the advantages attendant on its use, I claim as my invention:

1. A process for producing a gasoline-resistant coating on a surface which consists of (1) spreading on the said surface a liquid mixture of an organic polysulfide polymer which is a polyalkylene polysulphide characterized by the presence of a plurality of mercapto groups as substituents therein and an accelerator selected from the group consisting of the oxides and peroxides of copper, manganese, calcium, magnesium and zinc; and (2) thereafter exposing the so-called liquid coating to the action of a promoter selected from the group consisting of ammonia, aliphatic primary, secondary and tertiary amines, cyclic amines, and their aqueous solutions for a sufficient time whereby conversion to a non-liquid, tough, flexible, rubber-like coating highly resistant to the action of gasoline and other petroleum hydrocarbons results.

2. A process for producing a gasoline-resistant coating on a surface which consists of (1) spreading on the said surface a liquid mixture of an organic polysulfide polymer which is a polyalkylene polysulfide responsive to the generalized formula

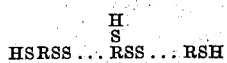

in which the signficant functional groups are SH groups and the connecting radical R is any polyvalent organic radical containing at least the grouping —$CH_2$— which results from the splitting off of at least 2 carbon-attached negative substituents from an organic compound initially containing at least 2 such substituents capable of being split off when the said compound is reacted with an alkali metal polysulfide, and an accelerator selected from the group consisting of the oxides and peroxides of calcium, copper, magnesium, manganese and zinc; and (2) thereafter exposing the so-applied liquid coating to the action of a promoter selected from the group consisting of ammonia, aliphatic primary, secondary and tertiary amines, cyclic amines, and their aqueous solutions for a sufficient time whereby conversion to a non-liquid, tough, flexible, rubber-like coating highly resistant to the action of gasoline and other petroleum hydrocarbons results.

3. The process of claim 1 in which the ratio of accelerator to polyalkylene polysulfide lies between 2 and 10 parts by weight, to 100 parts of the polyalkylene polysulfide.

4. The process of claim 1 in which the ratio of accelerator to polyalkylene polysulfide lies between 3 and 5 parts by weight, to 100 parts of the polyalkylene polysulfide.

5. The process of claim 1 in which the liquid organic polysulfide polymer is a polyalkylene polysulfide derived from a mixture of trichlorpropane and di(chlorethyl) formal by reaction with an alkali metal polysulfide, and having a molecular weight not exceeding 4000.

6. The process of claim 1 in which the accelerator is zinc peroxide.

7. The process of claim 1 in which the accelerator is zinc peroxide and the promoter is ammonia.

WALLACE K. SCHNEIDER.

REFERENCES CITED

The following references are of record in the file of this patent:

UNITED STATES PATENTS

| Number | Name | Date |
|---|---|---|
| 2,126,818 | Saeger | Aug. 16, 1938 |
| 2,282,948 | Dietzel | May 12, 1942 |
| 2,386,287 | Blaneo et al. | Oct. 9, 1945 |
| 2,398,998 | Blake | Apr. 23, 1946 |
| 2,402,977 | Patrick | July 2, 1946 |

FOREIGN PATENTS

| Number | Country | Date |
|---|---|---|
| 975 | Great Britain | 1913 |